(12) United States Patent
Gibson

(10) Patent No.: US 6,473,388 B1
(45) Date of Patent: Oct. 29, 2002

(54) ULTRA-HIGH DENSITY INFORMATION STORAGE DEVICE BASED ON MODULATED CATHODOCONDUCTIVITY

(75) Inventor: Gary Alfred Gibson, Palo Alto, CA (US)

(73) Assignee: Hewlett Packard Company, Palo Alto, CA (US)

( * ) Notice: Subject to any disclaimer, the term of this patent is extended or adjusted under 35 U.S.C. 154(b) by 215 days.

(21) Appl. No.: 09/652,777

(22) Filed: Aug. 31, 2000

(51) Int. Cl.⁷ .................................................. G11B 7/00
(52) U.S. Cl. ..................................... 369/126; 369/275.2
(58) Field of Search .............................. 369/126, 275.1, 369/275.2, 284, 288, 13.38; 340/270.1–270.13

(56) References Cited

U.S. PATENT DOCUMENTS 5,557,596 A 9/1996 Gibson et al.

FOREIGN PATENT DOCUMENTS

GB 1 513 141 * 6/1978

OTHER PUBLICATIONS

Jon William Toigo, "Avoiding a data crunch", Scientific American, vol. 282, No. 5, May 2000, p. 72.

* cited by examiner

*Primary Examiner*—Thang V. Tran

(57) ABSTRACT

An information storage device includes a cathodoconductive medium and pairs of electrodes in contact with the medium. Data storage areas are located within regions between the electrode pairs. A read operation on data storage areas between a pair of electrodes may be performed by creating an electric field between the electrodes, scanning an electron beam across the storage areas, and monitoring a cathodocurrent created by the carriers. Changes in magnitude of the cathodocurrent indicates the states of the storage areas. The energy beam may be supplied by an electron emitter or a near-field optical source.

25 Claims, 3 Drawing Sheets

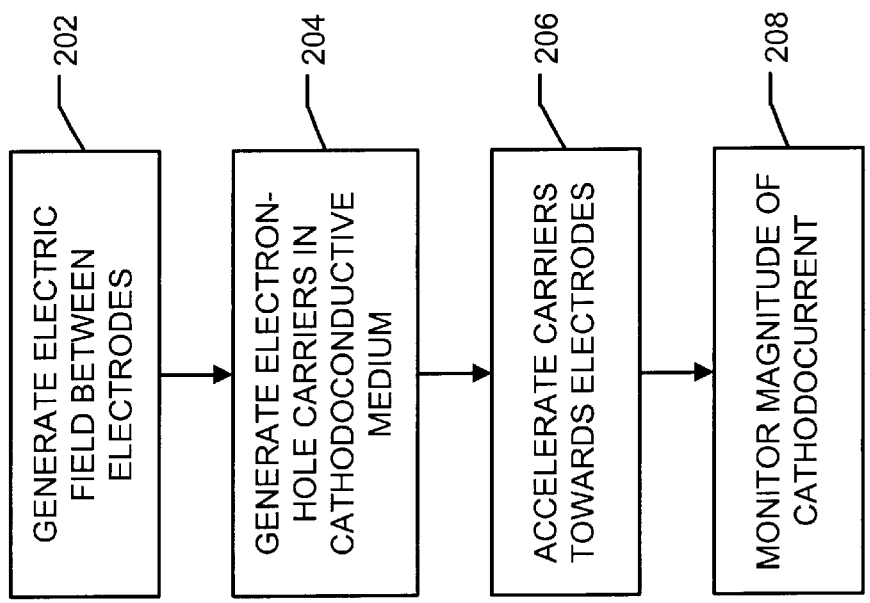
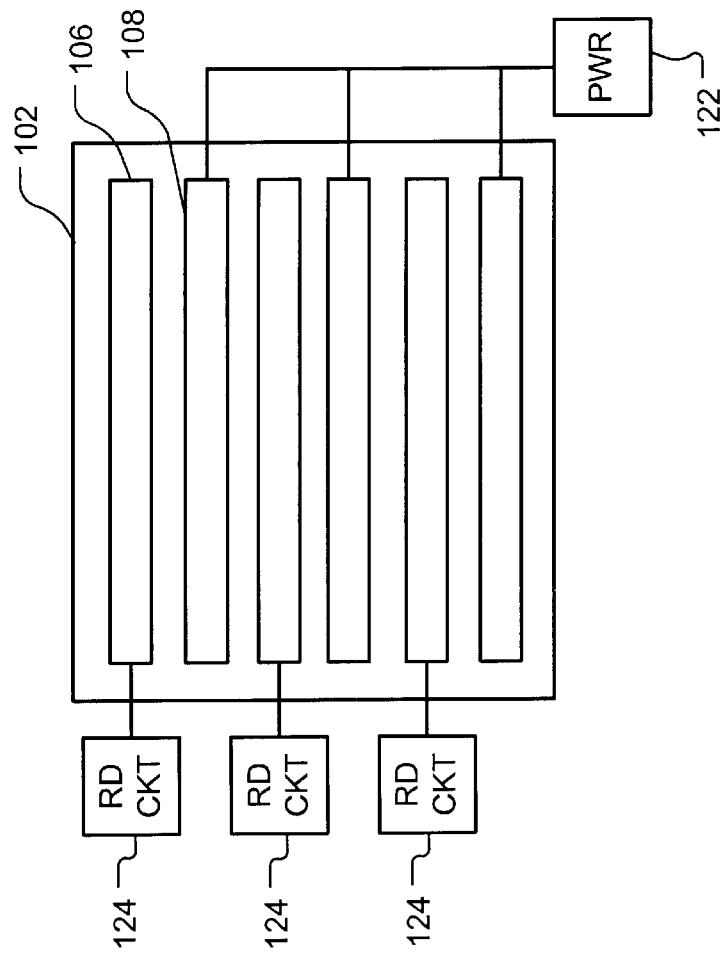

ULTRA-HIGH DENSITY INFORMATION STORAGE DEVICE BASED ON MODULATED CATHODOCONDUCTIVITY

BACKGROUND OF THE INVENTION

The present invention relates generally to information storage devices. More particularly, the present invention relates to information storage devices including energy beam sources such as, but not limited to, electron emitters and near-field optical sources.

For decades, researchers have been working to increase storage density and reduce storage cost of information storage devices such as magnetic hard-drives, optical drives, and semiconductor random access memory. However, increasing the storage density is becoming increasingly difficult. Conventional technologies appear to be approaching fundamental limits on storage density. For instance, information storage based on conventional magnetic recording is rapidly approaching fundamental physical limits such as the superparamagnetic limit, below which a magnetic bit is not stable at room temperature.

Information storage devices that do not face these fundamental limits are being researched. One such device, an ultra-high density information storage device, includes multiple electron emitters having electron emission surfaces that are proximate a storage medium. During a write operation, an electron emitter changes the state of a submicron-sized storage area on the storage medium by bombarding the storage area with a relatively high intensity electron beam having an appropriate pulse shape and amplitude. If the storage medium is based upon a phase-change material, the storage area might be changed from a crystalline state to an amorphous state or vice-versa. By changing the state of the storage area, a bit is written to the storage area.

During a read operation on a storage area, an electron emitter bombards the storage area with an electron beam. A resulting signal is detected to determine the state of that storage area. The electron beam used for read operations can be of a relatively low intensity so as not to change the state of the storage area.

SUMMARY OF THE INVENTION

According to one aspect of the present invention, a storage area is located within a region between two electrodes in contact with a cathodoconductive medium. A state of the storage area is read by generating an electric field across the region between the electrodes; bombarding the storage area with an energy beam; and monitoring the magnitude of a current flowing between the electrodes.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 2 and 3 are illustrations of different electrode patterns for the information storage device according to the present invention; and FIG. 4 is a flowchart of a method of reading a storage area on the information storage device according to the present invention.

DETAILED DESCRIPTION

Figure 1:
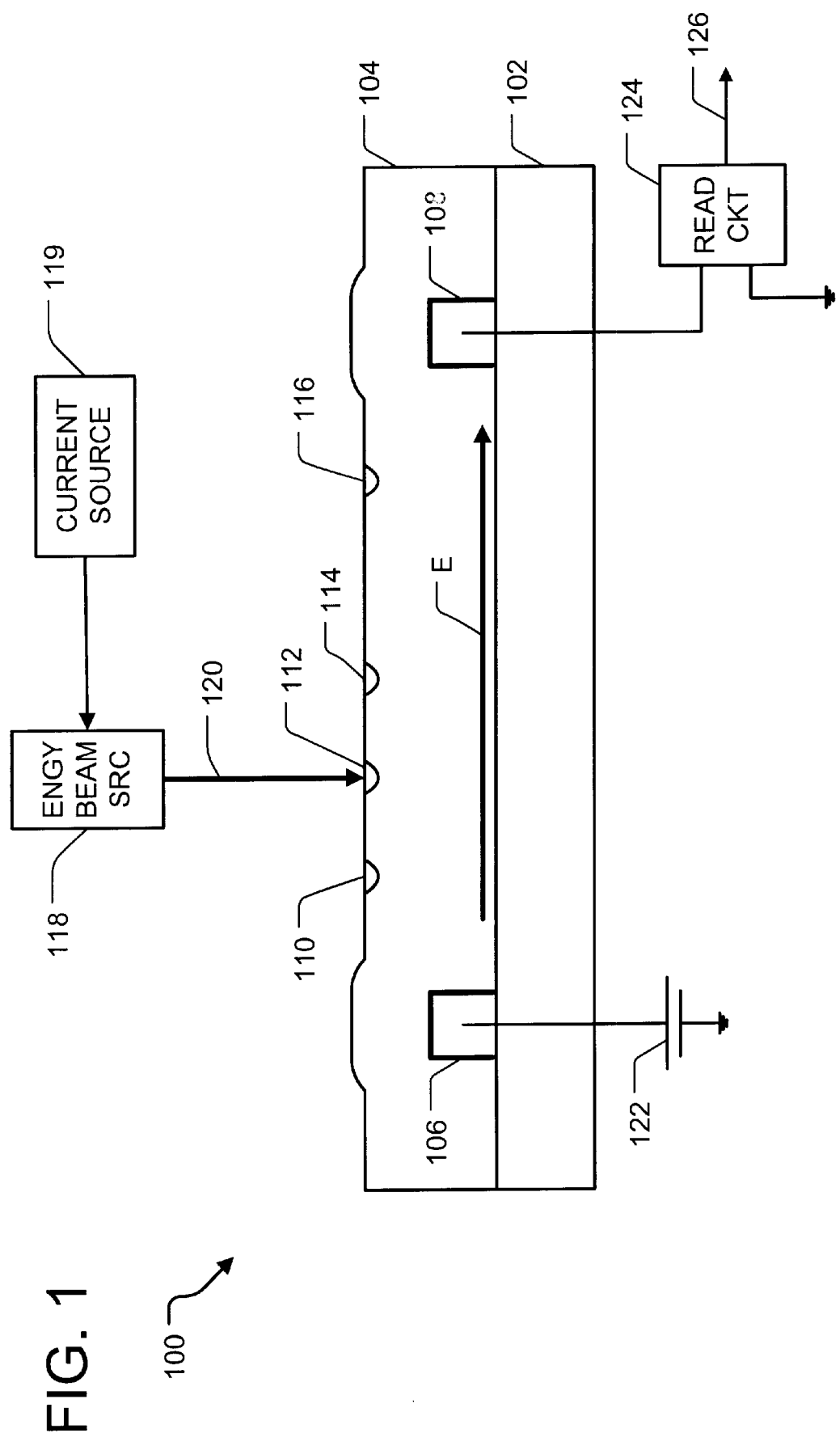
FIG. 1 is an illustration of an information storage device according to the present invention.

As shown in the drawings for purposes of illustration, the present invention is embodied in an ultra-high density information storage device. The storage device can have a relatively high current gain (defined herein as the ratio of signal current to electron beam current), even with relatively low energy beams. In some cases, reasonable signal current can be attained even with beam energy of less than 50 eV. Thus, power consumption is relatively low, dielectric breakdown is less likely, and design of a power supply for the storage device is simplified.

Referring to FIG. 1, the storage device 100 includes an electrically insulating substrate 102 and a cathodoconductive medium 104. The substrate 102 may be made of silicon having an oxidized top layer. A cathodoconductive medium 104 is on the oxidized top layer. For example, the cathodoconductive medium 104 may be made of a cathodoconductive chalcogenide-based phase change material made of at least one of following seven elements: Se, Te, S, Sb, Ag, In and Ga.

Preferably, the material has a high "dark" resistivity when not impinged by an energy beam and, therefore, has low "dark current." The cathodoconductive medium 104 may include a single layer of the cathodoconductive material, multiple layers of the same cathodoconductive material, or multiple layers of different cathodoconductive materials.

Local areas of the cathodoconductive material can be reversibly changed between at least two states by application of focused radiation with appropriate time dependence of power amplitude. For instance, local areas may be changed between amorphous and crystalline states, or they may be changed between different crystalline states. The state of an area may be changed from crystalline to amorphous by heating the area with a high intensity energy beam, enough to melt the phase change material, and then quickly decreasing the intensity of the beam to quench the area. Quenching a phase-change material causes it to cool rapidly into an amorphous state without time to anneal. The state of an area may be changed from amorphous to crystalline by using an energy beam to heat the phase-change material, just enough to anneal it.

A plurality of spaced-apart electrodes makes contact with the same cathodoconductive medium 104. Only one pair of first and second electrodes 106 and 108 is shown. The cathodoconductive material of the cathodoconductive medium 104 may be deposited over or under the electrodes 106 and 108.

An information storage region is located between the electrodes 106 and 108. The storage region includes a multitude of storage areas, with each storage area storing a bit of data. Only four storage areas 110, 112, 114 and 116 are shown in FIG. 1. The storage areas may be arranged in rows and columns. The value of a bit depends upon the state of the storage area. The storage areas are submicronsized. For example, the storage areas may be no more than about 10 nm to 30 nm in diameter and the centers of the storage areas may be no more than 50 nm apart. Storage area diameter is limited by factors such as energy beam diameter, energy beam shape, positioning accuracy, inter-symbol interference and signal-to-noise ratio. If a phase-change material is used, the storage area diameter is also limited by how small an amorphous bit can be made stable in a crystalline matrix or how small a crystalline bit can be made stable in an amorphous matrix.

The storage device 100 also includes an array of energy beam sources such as electron emitters 118 (only one electron emitter 118 is shown in FIG. 1). Various types of electron emitters 118 that may be used include, without limitation, field emitters, thermionic emitters and flat cathode emitters. An electron emitter 118 emits an electron beam 120 having appropriate time dependence of power amplitude to change a storage area between amorphous and crystalline states or between different crystalline states. Electron emission surfaces of the electron emitter 118 are proximate the cathodoconductive medium 104. Electron optics may be used to focus the electron beam 120.

The electron emitter 118 may be a point-emitter having a very sharp point. Radius of curvature may be about one nanometer to hundreds of nanometers. During operation, a pre-selected potential difference is applied between the electron emitter 118 and its corresponding gate electrode. Due to the sharp point of the electron emitter 118, an electron beam current is extracted from the electron emitter 118 towards the storage area 112. One such type of an electron emitter 118 is known as a "Spindt" emitter.

A constant current source 119 may be used in conjunction with the electron emitter 118. The constant current source 119 regulates the electron beam current at the desired amplitude. A simple constant current source may be realized by a FET near the electron emitter 118.

Micromovers may be used to scan the array of electron emitters 118 along the surface of the cathodoconductive medium 104. Exemplary micromovers are described in assignee's U.S. Pat. No. 5,986,381. These electron emitters 118 and micromovers may be fabricated by standard semiconductor microfabrication technology.

A power supply 122 applies a bias voltage across the electrodes 106 and 108 during a read operation. When the bias voltage is applied to the electrodes 106 and 108, an electric field E is induced in the plane of the cathodoconductive medium 104 and a dark current flows between the electrodes 106 and 108. The power supply 122 may be fabricated on the substrate 102 or it may be provided off-chip.

During read operations on storage areas between the electrodes 106 and 108, an electron beam 120 is scanned between the electrodes 106 and 108 while the bias voltage is being applied to the electrodes 106 and 108. When the electron beam 120 bombards a storage area 112 between the electrodes 106 and 108, electron carriers and hole carriers are created. The electric field E accelerates the free carriers towards the electrodes 106 and 108 until they recombine with other carriers. The electron carriers and the hole carriers need not necessarily reach the electrodes 106 and 108 for a signal current to result. The movement of the electrons and the holes causes a current to flow within the read circuit 124. This current is referred to as cathodocurrent.

Assuming a constant intensity read beam, the rate at which electrons and holes are generated depends up the state of the storage area 112. If a phase-change material is used, a contrast in cathodocurrent current magnitude results from the difference in material properties of a written (e.g., amorphous) and unwritten (e.g., crystalline) areas. The electron density of states and geminate recombination rate are different for the written and unwritten areas, resulting in a difference in the rate at which free carriers are generated (the geminate recombination rate may be characterized as the rate at which the initially created electron-hole pairs recombine before they can be separated into free carriers). Further current magnitude contrast may be obtained from differences in the lifetime or mobility of the free carriers for written and unwritten areas. For example, geminate recombination for free carriers will be higher, mobility lower and carrier lifetime shorter, in an amorphous material than in the crystalline material. Additional contrast may arise from differences in resistivity and the effects at the interface (e.g., built-in fields, interface recombination, band offsets, interface traps) between written and unwritten areas. Thus the interface effects can cause a contrast in cathodocurrent depending upon the state of the material that is impinged by the electron beam.

Consequently, the cathodocurrent magnitude of a written storage area 112 is different than the cathodocurrent of an unwritten storage area 112. The magnitude of the difference in cathodocurrent is discernibly greater than magnitude of the noise in the dark current.

By monitoring changes in the magnitude of the cathodocurrent while scanning the read energy beam, the state of the storage area 112 can be determined. The changes in the magnitude of the cathodocurrent may be detected by a read circuit 124, which is connected between one of the electrodes 106 and 108 and a reference potential. The read circuit 124 may include one or more amplifier stages for amplifying the cathodocurrent and a current-to-digital converter ("IDC") for converting the amplified cathodocurrent into a digital value. The read circuit 124 may be fabricated on the substrate 102 or it may be off-chip. An output 126 of the read circuit 124 indicates magnitude of the cathodocurrent.

The storage device 100 has a "built-in current gain mechanism." Current gain can be made much greater than unity. For a given bias between the electrodes 106 and 108, the current gain may be increased by increasing the ratio a/b, where a is the distance that a carrier travels before recombination, and b is the distance between the electrodes 106 and 108. Large contrast in current gain will generally be displayed by materials having relatively large differences in geminate recombination rate, carrier mobility and carrier lifetime.

After a free carrier is created, it might cross a number of written and unwritten storage areas before recombination occurs. This can lead to inter-symbol interference, that is, interference between bits. Such inter-symbol interference may be reduced by making the bits shallow relative to the thickness of the cathodoconductive medium 104. As an example, the electric field E at any point in the cathodoconductive medium 104 will depend upon the size, shape, number and position of surrounding storage areas. The inter-symbol interference arises, in part, because the cathodocurrent is influenced by the electric field E along the path that carriers take through the cathodoconductive medium 104. Shallow data storage areas ameliorate this problem. The data storage areas may be made shallow by controlling power/duration of the electron beam 120, thickness of the cathodoconductive medium 104 and thermal properties (e.g., heat capacity, thermal conductivity) of the cathodoconductive medium 104 and the substrate 102.

If the magnitude of the dark current is too large, the cathodocurrent might be obscured. This problem can be overcome by forming blocking contacts at the electrodes 106 and 108. The blocking contacts may be formed, for example, by using metals for the electrodes 106 and 108 that create Schottky barriers with the cathodoconductive medium 104. The Schottky barriers can be arranged to impede the dark current but not impede the cathodocurrent. Different metals for the electrodes 106 and 108 may be used. For instance, one metal might be used for one electrode 106 to block carriers of one polarity, and/or another metal might be used on the other electrode 108 to block carriers of the opposite polarity.

The emitter array may contain any number of electron emitters 118. For example, the emitter array may include hundreds or thousands of electron emitters 118. The electron emitters 118 may be addressed simultaneously or in a multiplexed manner during read and write operations.

With hundreds or thousands of electron emitters reading and/or writing information in parallel, the storage device 110 has very fast access times and data rates. Electrode pairs such as electrodes 106 and 108 may divide the cathodoconductive medium 104 into many different storage regions. There may be any number of electron emitters 118 per electrode pair, but only one electron emitter per region is used at any given time. For example, an array may include ten thousand electron emitters, and one hundred pairs of electrodes 106 and 108 may be in contact with the cathodoconductive medium 104. The one hundred electrode pairs define one hundred data storage regions.

During a read operation, the micromover moves the array to a new location, then one hundred bits (i.e., data storage areas) are read by one hundred electron emitters 118, then another one hundred bits are read by one hundred different electron emitters, and so on until all ten thousand probes have read a bit. The micromover then shifts the array to a new location, and another ten thousand bits are read (the micromover may instead move the array continuously, with the data storage areas being staggered). Each of the one hundred electron emitters 118 active at a given time would be operating between a different electrode pair 106 and 108.

FIG. 2 shows a possible pattern for the electrodes 106 and 108. The first and second electrodes 106 and 108 are interdigitated. A read circuit 124 is provided for each pair of electrodes 106 and 108, with each first electrode 106 being connected to a read circuit 124 and each second electrode 108 being connected to the power supply 122.

Figure 3:
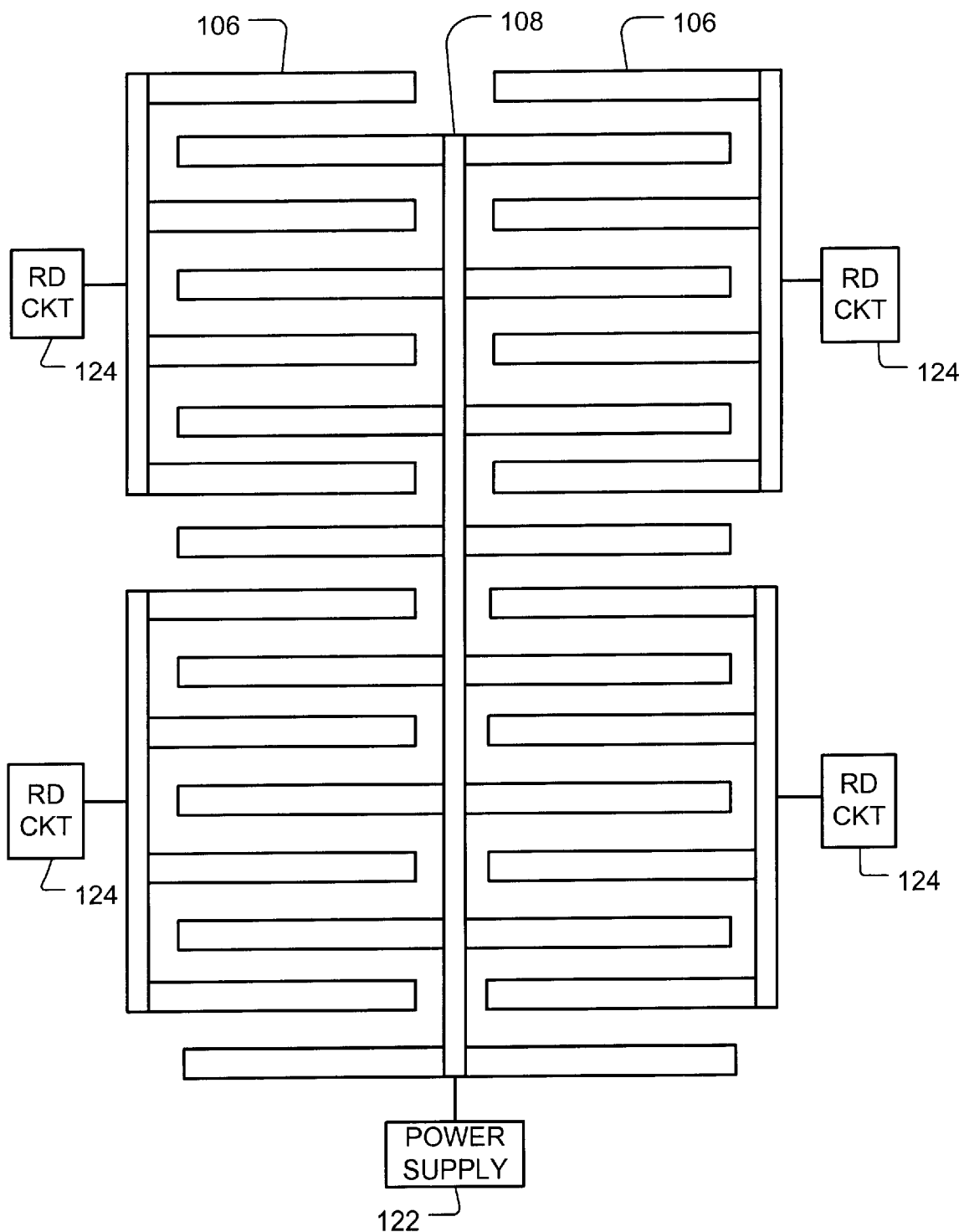

FIG. 3 shows another possible pattern for the electrodes 106 and 108. The second electrode 108 is shared or common and the first electrodes 106 are coupled to read circuits 124. The power supply 122 biases the common electrode 108 relative to the first electrodes 106.

There may be one first electrode 106 per read circuit 124, or there may be multiple first electrodes 106 per read circuit. Multiplexers may be used to connect multiple first electrodes 106 to a single read circuit 124.

To minimize noise due to leakage currents, the storage medium may be broken into separate regions, each with its own pair of interdigitated fingers and read circuit 124 (as shown in FIG. 2). To minimize the area wasted on electrodes, on the other hand, the common electrode would be more efficient (as shown in FIG. 3).

Too long an electrode could cause excessive dark current. The dark current, if too large, could make it more difficult to detect magnitude changes in the cathodocurrent. Fragmenting the electrodes can reduce the dark current.

FIG. 4 illustrates a method of reading a storage area between two electrodes. A voltage is applied across the electrodes to create an electric field across the region between the electrodes (block 202). As a result of the electric field, a dark current having a nominal magnitude flows between the electrodes. An energy beam is scanned across the regions between the electrodes. When the energy beam bombards the storage area, electron-hole pairs in the cathodoconductive layer are generated near the surface of the cathodoconductive medium (block 204). The electric field, which extends to the surface of the cathodoconductive medium, accelerates the electron-hole pairs towards the electrodes (block 206), resulting in an increase in the magnitude of the current flowing between the electrodes.

Magnitude of the current flowing between the electrodes is monitored to determine the state of the storage area (block 208). The cathodocurrent has a first magnitude if the storage area is at a first state, and the cathodocurrent has a second magnitude if the storage area is at a second state. Thus, the change in current magnitude indicates the state of the storage area and, therefore, the value of the bit.

Thus disclosed is an ultra-high density storage device 100 having a relatively high current gain, even when the electron beam has a relatively low energy. Thus, power consumption can be kept relatively low, dielectric breakdown can be minimized, and design of a power supply for the device can be simplified.

The storage device 100 does not rely upon changes in tunneling or emission currents due to changes in the property of the storage medium (e.g., resistivity, topography) to read the data storage areas. Therefore, either constant current sources may be employed in series with electron emitters, or the emission current may be separately monitored and normalized out of the measured cathodocurrent. Consequently, the storage device 100 can be made insensitive to changes in tip-to-media spacing, changes in emitter properties or other changes that can affect electron beam current.

In the storage device 100, the number of constraints placed on the material properties of the cathodoconductive medium 104 and substrate 102 are reduced as compared to an approach such as a "diode approach." For instance, the storage device 100 may include a phase-change layer 104 that does not form a good, low-leakage diode with the substrate 102, and it may include a substrate 102 that does not form a good diode with the phase-change layer.

There is also more leeway to choose a substrate material that has optimal thermal properties for writing. The substrate 102 of the storage device 100 needs only to be electrically insulating.

The resistivity of the phase-change material can be larger than in the diode approach. Large electric fields that extend all the way to the surface of the cathodoconductive medium may be applied, which is of great benefit when using low-energy electron read beams that only penetrate a few nm into the phase-change layer. Larger current gains (ratio of signal current to read beam current) are possible.

The cathodoconductive layer is not limited to materials that can be changed between crystalline and amorphous states. The material may use any change of state or condition that affects the cathodocurrent, provided that a large signal contrast results when areas having different states or conditions are bombarded by the energy beam. For example, the cathodoconductive layer may rely upon locally trapped charges, local changes in the number or nature of defect states, or conformational changes in polymers.

The energy beam source is not limited to electron emitters. The energy beam source may be any other flux-generating source that causes electron-hole pairs to be created in the cathodoconductive layer. For example, a near-field optical source can generate a light beam that creates electron-hole carriers in the cathodoconductive layer (cathodoconductive materials are usually photo-conductive as well). A near-field optical source in close proximity to the storage medium would achieve high data density, or spatial resolution, beyond that achievable by diffraction limited optics.

A third electrode may be used to detect the cathodocurrent. The electric field may be provided by an element external to the storage device.

In FIG. 1, the electrodes are shown on top of the substrate (and under the cathodoconductive medium). However, the electrodes may be fabricated over or at the same level as the cathodoconductive medium. The electrodes may instead be stacked vertically with the cathodoconductive medium, with each pair of opposing electrodes sandwiching a layer of cathodoconductive material.

The electrodes are not limited to the geometry and patterns shown in FIGS. 2 and 3. The electrodes may be arranged in patterns other than interdigitation. The electrodes may have a geometry other than straight and elongated. For example, the electrodes may be serpentine-shaped.

Dimensions of the electrodes, distances between the electrodes and bias voltages applied to the electrodes are device-specific. Generally, it is desirable to space the electrodes as far apart as possible, while maintaining a sufficient electric field that can accelerate the electron-hole carriers towards the electrodes. Increasing the spacing reduces the number of electrodes, which, in turn, increases the usable storage surface of the device.

The electric field need not be in-plane. It need only be sufficient to accelerate free carriers towards electrodes.

Within a storage region, the storage areas may be arranged in rows and columns. However, the storage areas are not limited to such an arrangement.

The present invention is not limited to the specific embodiments described and illustrated above. Instead, it is construed according to the claims that follow.

What is claimed is:

1. A method of reading a storage area in an information storage device having a pair of spaced apart electrodes in contact with a cathodoconductive medium, the storage area being between the two electrodes, the method comprising:
   creating an electric field between the electrodes;
   bombarding the storage area with an energy beam to create charge carriers in the cathodoconductive layer; and
   monitoring magnitude of a current flowing between the electrodes.

2. The method of claim 1, wherein an electron emitter is used to bombard the storage area with the energy beam.

3. The method of claim 1, wherein a near-field optical source is used to bombard the storage area with the energy beam.

4. The method of claim 1, wherein the electric field is used to separate the carriers and accelerate the carriers towards an electrode.

5. The method of claim 1, further comprising the step of determining a state of the storage area from the monitored current magnitude.

6. The method of claim 1, wherein the storage area is relatively shallow and located at a surface of the cathodoconductive medium.

7. A storage device comprising:
   a storage medium including a cathodoconductive medium and a pair of spaced apart electrodes in contact with the cathodoconductive medium, a data storage region being between the electrodes; and
   at least one energy beam source associated with the storage region;
   the electrodes being adapted to receive a voltage during read operations on storage areas within the storage region, the voltage creating an electric field across the storage region.

8. The device of claim 7, wherein the storage areas are submicron-sized.

9. The device of claim 7, wherein the cathodoconductive medium is made of a phase-change material.

10. The device of claim 7, wherein the cathodoconductive medium is changeable between at least two different states having properties that cause a substantial contrast in cathodocurrent when impinged by an energy beam.

11. The device of claim 10, wherein the properties include at least one of geminate recombination rate, carrier mobility, carrier lifetime, resistivity, electron density of states, and interface effects that cause a contrast in cathodocurrent when impinged by an energy beam.

12. The device of claim 7, further comprising a source for applying a bias voltage across the electrodes during a read operation, wherein the voltage creates the electric field.

13. The device of claim 7, further comprising a read circuit for detecting changes in magnitude of a cathodocurrent flowing between the electrodes during a read operation.

14. The device of claim 7, wherein the energy beam source includes an electron emitter.

15. The device of claim 7, wherein the energy beam source includes a near-field optical source.

16. The device of claim 7, wherein the energy beam source includes a constant flux source.

17. The device of claim 7, wherein the electrodes form blocking contacts.

18. The device of claim 7, wherein the data storage areas are shallow relative to the cathodoconductive layer.

19. A storage medium for an information storage device having a plurality of electron emitters, the storage medium comprising:
   an insulating substrate;
   a cathodoconductive medium on the substrate, the cathodoconductive medium being changeable between at least two different states having properties that cause a substantial contrast in the cathodocurrent induced by an energy beam; and
   a plurality of spaced apart electrodes in contact with the cathodoconductive layer.

20. An information storage device comprising:
   a cathodoconductive layer;
   a pair of spaced apart electrodes in contact with the layer;
   means for creating carriers at an area of the cathodoconductive layer between the electrodes;
   means for accelerating the carriers between the electrodes; and
   means for monitoring magnitude of a current created by the carriers.

21. A method of storing information on a cathodoconductive medium, the method comprising substantially changing cathodoconductivity of selected data storage areas on the phase change medium.

22. The method of claim 21, wherein the cathodoconductivity is changed by changing at least one of the following properties of the phase change material: contrast in at least one of geminate recombination rate, carrier mobility, carrier lifetime, resistivity, electron density of states and interface effects that cause a contrast in the cathodocurrent induced by an energy beam.

23. A method of storing information on a phase change medium, the method comprising using a first energy beam to locally change properties of the medium such that an increase in induced cathodocurrent occurs when a second energy beam is scanned across the medium.

24. An information storage device comprising:

a cathodoconductive medium; and means for substantially changing cathodoconductivity of selected data storage areas on the phase change medium during write operations.

25. An information storage device comprising:

a cathodoconductive medium; and means for using a first energy beam to locally change properties of the medium such that a change in induced cathodocurrent occurs when a second energy beam is scanned across the medium.

* * * * *